US007266508B1

(12) United States Patent
Owen et al.

(10) Patent No.: US 7,266,508 B1
(45) Date of Patent: Sep. 4, 2007

(54) SYSTEM AND METHOD FOR MANAGING CUSTOMER CONTACTS AND RELATED INFORMATION

(75) Inventors: April A. Owen, Alabaster, AL (US); Nan S. Shelley, Birmingham, AL (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 09/577,658

(22) Filed: May 25, 2000

(51) Int. Cl.
*G06Q 10/00* (2006.01)
(52) U.S. Cl. .................... 705/11; 705/7; 705/8; 705/10
(58) Field of Classification Search .................. 705/11, 705/10, 7, 8
See application file for complete search history.

(56) References Cited

U.S. PATENT DOCUMENTS 5,930,764 A * 7/1999 Melchione et al. ........... 705/10

FOREIGN PATENT DOCUMENTS

JP 09101984 A * 4/1997

OTHER PUBLICATIONS

Zarowitz et al., Using Technology to Maximize Marketing Opportunity: PR Management for the 21st Century, Public Relations Tactics, New York, vol. 5, Issue 11, Nov. 1998, p. 18 [PROQUEST].*
Kraft, K., There's a Goldmine in Collections! Using Contact Management Software to Mange Your Collection Effort, Newspaper Financial Executives Quarterly, Reston, vol. 3 Issue 4, Third Quarter 1997, pp. 28-29 [PROQUEST].*
Clark, D., Salesforce.com Rides Latest Software Revolution, The Wall Street Journal, New York, Eastern edition, Dec. 2, 1999, p. B, 10:4 [PROQUEST].*
Metzler, J., Contact Managers Build a Database to Hike Sales, Accounting Today, New York, vol. 9, issue 18, Oct. 9, 1995, starting p. 22 [PROQUEST].*
Davis, Contact Management Software that works for you, Accounting Today, Jan.5-Jan. 25, 1998, p. 25-32 [PROQUEST].*
"Upshot Sales Features List", pp. 1-2, web.archive.org webpage of Feb. 21, 1999.*
"Upshot: Use the Coolest Stuff", pp. 1-2, web.archive.org webpage of Feb. 24, 1999.*
"Upshot: Be Sales-Focused", pp. 1-2, web.archive.org webpage of Feb. 24, 1999.*
PRNewswire, "Upshot® Sales Goes 'Unplugged'", Apr. 12, 1999, pp. 1-2.*
Charles, Erik et.al. "Tracking Sales Performance", Mar. 2000, ACA news, pp. 39-41, retrieved from the web at: ; http://segalsibson.com/publications/reprints/Tracking_Sales_Performance.pdf.*

(Continued)

*Primary Examiner*—Tariq R. Hafiz
*Assistant Examiner*—Jonathan G. Sterrett
(74) *Attorney, Agent, or Firm*—Withers & Keys, LLC

(57) ABSTRACT

A system and method for retaining institutional customer contact knowledge and experience is disclosed. The system and method permits multiple users to interact with a centralized database that retains customer contact information. The system and method allows multiple users to send information to the database. The database also makes the customer contact information available to multiple users. In another aspect of the invention, customer contact information can be used to measure the performance of a firm's employees.

9 Claims, 7 Drawing Sheets

OTHER PUBLICATIONS

Burt, Bob; "Symantec ACT! 4.0 for Windows 95", PC Update Online!, Feb. 1999, PC Update: The magazine of the Melbourne PC User Group, retrieved from the web at: http://www.melbpc.org.au/pcupdate/9902/9902articel10.htm.*

Anonymous, The 1996 Software Guide: Targeting and reaching the right customers more effectively, Jun. 1996, Direct Marketing, vol. 59, Iss. 2, p. 34, 12 pgs. ProQuest ID 9807739.*

Johnson, Amy Helen; "Data warehousing", Dec. 6, 1999, Computerworld, Framingham, vol. 33, Iss. 49, p. 74, 1pgs., ProQuest ID 47013131.*

Engle, Robert; et.al. "Sales force automation usage, effectiveness and cost benefit in Germany, England and the United States", 2000, The Journal of Industrial Marketing, vol. 15, Iss. 4, p. 216, ProQuest ID 115716829.*

"SalesLogix Home Page", Jan. 25, 1999 webpage of web.archive.org from salelogix.com, pp. 1-2.*

Anonymous, "Private Profiles: Upshot", Jun. 22, 1998, Computer Letter, retrieved from web.archive.org webpage from upshot.com on Jun. 28, 1999, pp. 1-2.*

"Upshot Sales System Requirements", Feb. 21, 1999 webpage of web.archive.org from upshot.com, pp. 1-2.*

"Upshot Selection Guide", Jan. 20, 1998 webpage of web.archive.org from upshot.com, p. 1.*

\* cited by examiner

Browse Proactive Customers Form – For Selected Module

| | | |
|---|---|---|
| MAN FID | S3VGQ | Select by name: [ ] |
| local service | $ 11,669.72 | Select by MAN: [ ] |
| number of accts | 47 | |
| Name assigned to MAN | 1ST FRANKLIN | |
| AE assigned to Customer | [ ] | Edit Customer Data — 406 — Display Report of Accts for Selected MAN |
| Customer Contact | [ ] | 408 — Print Report of Accts for Selected MAN |
| Contact Number | [ ] | |
| Remarks | [ ] | Edited by: VIRGINIA LEWIS |
| | | Last Edit: 5/26/1999 |

402 brackets the left field group.

| | | |
|---|---|---|
| MAN FID | S0427 | Select by name: [ ] |
| local service | $ 4,259.16 | Select by MAN: [ ] |
| number of accts | 15 | |
| Name assigned to MAN | A C WHITE TRANSFER & | |
| AE assigned to Customer | [ ] | Edit Customer Data — Display Report of Accts for Selected MAN |
| Customer Contact | [ ] | Print Report of Accts for Selected MAN |
| Contact Number | [ ] | |
| Remarks | [ ] | Edited by: [ ] |
| | | Last Edit: [ ] |

| | | |
|---|---|---|
| MAN FID | S0NG5 | Select by name: [ ] |
| local service | $ 8,682.86 | Select by MAN: [ ] |
| number of accts | 21 | |
| Name assigned to MAN | A J MORRIS & | |
| AE assigned to Customer | [ ] | Edit Customer Data — Display Report of Accts for Selected MAN |
| Customer Contact | [ ] | Print Report of Accts for Selected MAN |
| Contact Number | [ ] | |
| Remarks | [ ] | Edited by: [ ] |
| | | Last Edit: [ ] |

Browse Mid Mkt Accounts – by Billing Name

| | | | | |
|---|---|---|---|---|
| bill number | 205 221 0585 296 | proactive ind | | |
| cent fid | CCO | reactive ind | | |
| site | A | bms target ind | | |
| name | ALABAMA THRIFT | do not call ind | | |
| addr2 | STORE | module ind | | |
| addr3 | P O BOX 621 | | | |
| addr4 | JASPER AL 35502 | non-ebs ind ✓ | rsb ind | |
| addr5 | | ebs ind | club smy in | |
| man fid | S1NA2 | | edi ind | |
| local service | $121.28 | | dab prod in | |
| input date | 3/1/1999 | | mtb ind | |
| input by | system | | bms ind | |
| | | | ckf ind | |
| | | | club ind | |

Show Accts for Selected MAN

Create a Select Referral for this customer

Jump to Name beginning with:
a g m s y
b h n t z
c i o u
d j p v
e k q w
f l r x
Not Alpha — 706

Move Displayed Customer/Accts to Reactive Tables

Move Displayed Account to BMS Target Table

Ensure that the appropriate Module is selected before moving to Reactive or BMS Tables.

---

| | | | | |
|---|---|---|---|---|
| bill number | 205 214 7355 211 | proactive ind | | |
| cent fid | CCO | reactive ind | | |
| site | A | bms target ind | bms target |
| name | BHAM TWO WAY | do not call ind | | |
| addr2 | 2425 2ND AV S | module ind | c | |
| addr3 | BIRMINGHAM AL 35233 | | | |
| addr4 | | non-ebs ind ✓ | rsb ind | |
| addr5 | | ebs ind | club smy in | |
| man fid | S1H33 | | edi ind | |
| local service | $216.50 | | dab prod in | — 708 |
| input date | 3/1/1999 | | mtb ind | |
| input by | system | | bms ind | |
| | | | ckf ind | |
| | | | club ind | |

Show Accts for Selected MAN

Create a Select Referral for this customer

Jump to Name beginning with:
a g m s y
b h n t z
c i o u
d j p v
e k q w
f l r x
Not Alpha Move Displayed Customer/Accts to Reactive Tables Move Displayed Account to BMS Target Table — 710

Ensure that the appropriate Module is selected before moving to Reactive or BMS Tables.

---

| | | | | |
|---|---|---|---|---|
| bill number | 205 221 0450 001 | proactive ind | | |
| cent fid | CCO | reactive ind | | |
| site | A | bms target ind | | |
| name | COMPUTER CONNEC | do not call ind | | |
| addr2 | P O BOX 1602 | module ind | | — 704 |
| addr3 | JASPER AL 35502 | | | |
| addr4 | | non-ebs ind ✓ | rsb ind | |
| addr5 | | ebs ind | club smy in | |
| man fid | S7S4S | | edi ind | |
| local service | $76.85 | | dab prod in | |
| input date | 3/1/1999 | | mtb ind | |
| input by | system | | | |

702

Jump to Name beginning with:
a g m s y
b h n t z
c i o u
d j p v
e k q w
f l r x
Not Alpha

FIGURE. 7 — 700

SYSTEM AND METHOD FOR MANAGING CUSTOMER CONTACTS AND RELATED INFORMATION

BACKGROUND

1. Field of the Invention

The present invention relates to marketing and customer service systems, and more specifically, to a system and method for recording and retrieving information, including customer contact information and information regarding the results of each customer contact.

2. Background of the Invention

The ability to target customers likely to purchase products or services and to solicit such sales is a powerful tool in the fields of marketing and customer service. Often, targeting such customers and closing those sales is not a one-time event. Instead, the process requires persistent, yet courteous follow-ups with the potential customer. In cultivating a positive relationship, a customer contact administrator or sales representative must be able to identify a customer's needs, to present those needs to the customer in a clear manner, and to follow up in polite ways to accommodate the schedule of the customer. Thus, with what is frequently a protracted process toward a product sale, the customer contact administrator must maintain accurate and complete records about the customer's interests, about what the customer has voiced interest in, and about the dates and times that are most convenient to the customer. In this manner, the administrator can avoid alienating the customer with too frequent dealings, yet can maintain just enough polite contact that leads to a sale.

Maintaining manual contact records for a few customers might be manageable. However, typically, companies charge administrators with the task of contacting hundreds of customers per month in an effort to obtain as many sales as possible. Faced with such daunting numbers, manual record keeping becomes impractical and administrators look to data storage devices to manage the large amount of customer contact information.

Customer contact administrators originally kept manual records of all customer contacts, sometimes referred to as a contact log or diary. Later efforts used spreadsheet software applications, such as Lotus or Excel. However, these spreadsheets were still essentially manual records that were typed into a computer.

Beyond simple spreadsheets, some employers use database applications to enter contact information on an ongoing basis. At the end of each period (for example a month), an employer prints out the database information and enter totals from the database into a spreadsheet (for example, Excel) to calculate the total number of contacts made for the month, broken down by customer contact administrator. Therefore, to obtain periodic (e.g., monthly) customer contact statistics for performance evaluation purposes, employers have the burdensome task of printing out periodic reports and then rekeying them into new spreadsheets to calculate periodic totals and other statistics.

SUMMARY OF THE INVENTION

The present invention is designed to overcome the shortcomings of the prior art and to provide a system for capturing and storing institutional or company knowledge, and making that knowledge available to all or some of the employees of the company.

Accordingly, the present invention includes a method for retaining and using contact information comprising the steps of: receiving contact information from one of many employees; storing that contact information and associating the contact information with a particular entity or customer; receiving other contact information from either the same or different employees; and making the contact information available to as many employees as desired.

In another aspect, the invention receives contact information through a web site.

In another aspect, the first and second items of contact information are received from different employees.

In another aspect, the invention characterizes the quality of the contact to determine if the contact was a serious sales or marketing contact, or just a simple follow up or confirmation of service delivery.

In another aspect, the invention includes the use of a database and can automatically interact with a billing system to retrieve billing information. The database stores billing account information for each customer, rewriteable by a software application. The database includes general customer information such as the account executive responsible for the customer, the customer's name, the customer's address, the customer's telephone number, and any general remarks about the customer. The database can also store historical contact information, such as the dates of communications with the customer, the products or other matters discussed during the contacts, the number and types of products sold to the customer, and a follow up date if one is warranted.

In another aspect, the invention has the capability to generate reports, including a follow up list. For example, the invention can sort the database by follow up date so that customer contact administrators can print out status reports showing who must be contacted and in what order. Preferably, the invention automatically generates the status reports and prompts the customer contact administrators to contact a customer using, for example, a Windows pop-up screen. The invention also has the ability to sort and query a database of information to provide metrics studies on categories such as the number of contacts made per month, the number of quality contacts that represented real sale opportunities, and the number of products sold per month.

In another aspect, the invention automatically notifies employees of appointed contacts and follow up appointments.

In another aspect, the invention retains and uses contact information comprising the steps of: receiving contact information from one of the employees; storing the contact information in a database and associating the contact information with a particular entity; and permitting a second employee to access the database and retrieve the contact information.

In another aspect, the invention can be used to track the performance of an employee. This is done by the following steps: receiving customer contact information related to a customer contact from the employee, including information related to the quality of the customer contact; storing the customer contact information related to the employee for a period of time, for example, a week or month; and producing a report for the period of time, the report including at least some of the customer contact information collected for the period of time. Managers can then check the number and quality of customer contacts for the given employee and compare those statistics with goals or expectations for that employee.

In another aspect, the invention includes a system for retaining customer contact information comprising: an interface portion communicating with some employees and adapted to send and receive information to and from the employees; and a database in communication with the interface portion, the database comprising memory and information in the memory, including information related to a particular customer, wherein the system permits one of the employees to store information related to the customer and the system permits another employee to retrieve information related to the customer.

In another aspect, the interface includes provisions that facilitate and simplify the retrieval and entry of information in a variety of useful ways.

Additional features and advantages of the invention will be set forth in the description that follows, and in part will be apparent from the description, or may be learned by practicing the invention. The objectives and other advantages of the invention will be realized and attained by the structure particularly pointed out in the written description and claims as well as the appended drawings.

Accordingly, it is an object of the present invention to provide a system and method for customer contact administrators to store and retrieve customer contact information, to track the time and content of interactions with a customer, and to record the date and description of product sales to customers.

It is another object of the present invention to provide a system and method for storing contact information about customers and event information summarizing the time and content of customer contact.

It is another object of the present invention to provide reporting capabilities that produce statistical evaluations of customer contact administrators for use in performance appraisals.

BRIEF DESCRIPTION OF THE DRAWINGS

FIG. 4 is a preferred embodiment of a browsing screen according to the invention.

Figure 6:
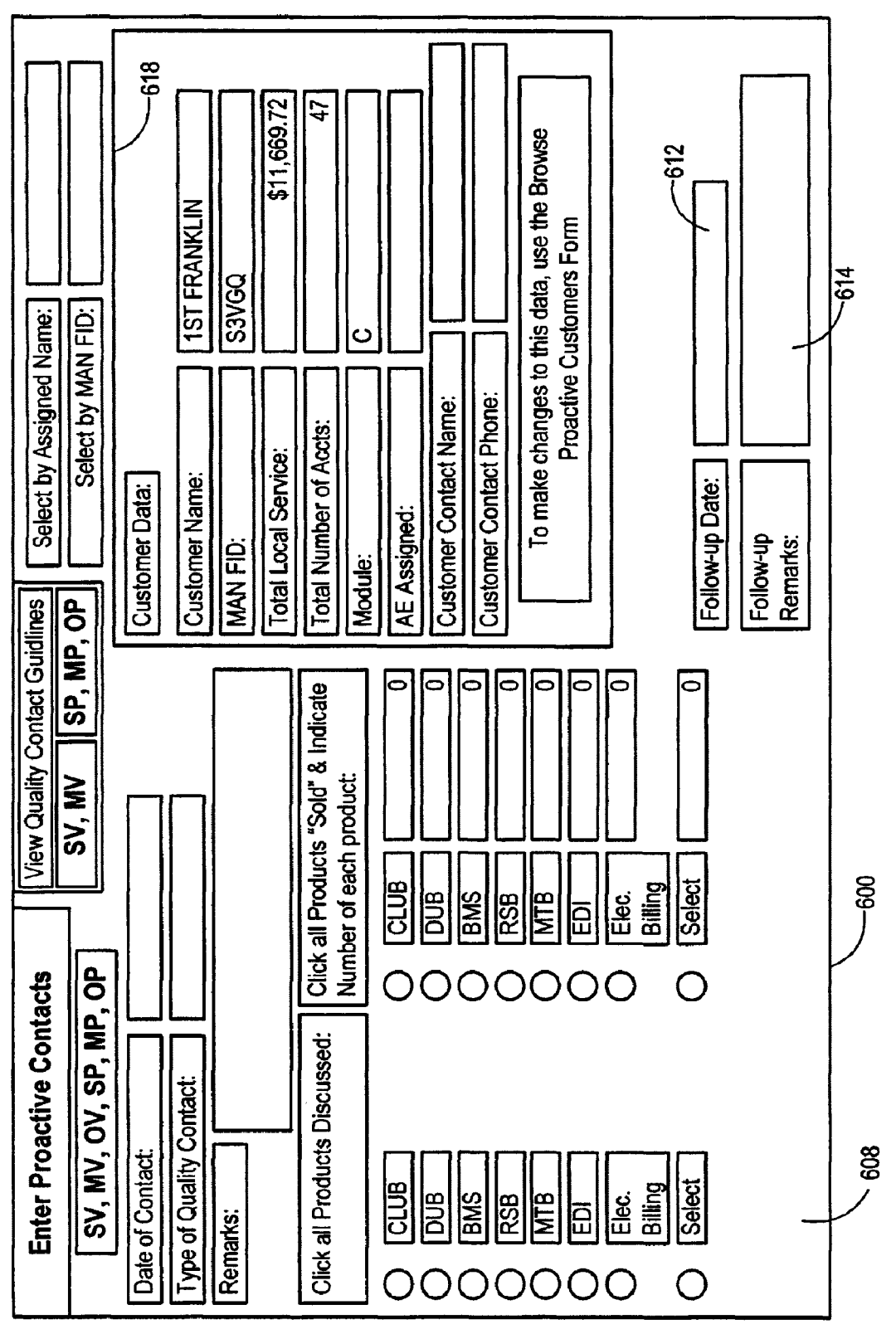

FIG. 6 is a preferred embodiment of a data entry screen according to the invention.

FIG. 7 is a preferred embodiment of a browsing screen according to the invention.

DETAILED DESCRIPTION OF THE INVENTION

Figure 1:
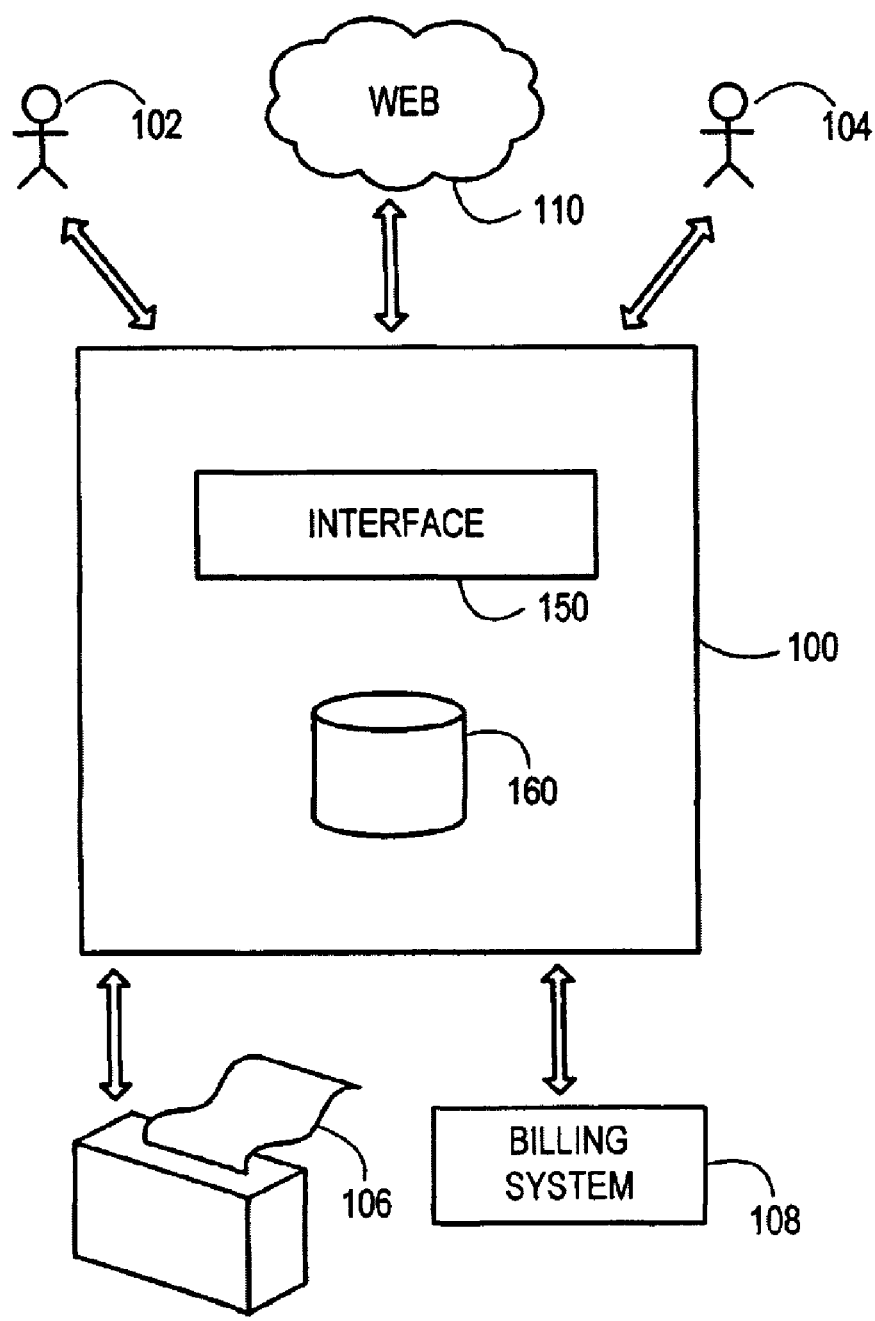
FIG. 1 is a schematic diagram of a preferred embodiment of the present invention.

FIG. 1 is a schematic diagram of a generalized embodiment of the present invention. Unlike prior art systems, in which individual sales representatives (referred to as "sales reps") kept their own contact information, the present invention uses a centralized customer contact database (referred to as simply "database") 100 to retain customer information. Sales reps 102 and 104 interact with database 100 in two general ways: they send information to database 100 and they retrieve information from database 100. For clarity, in the following example, sales reps 102 send information to database 100 while sales reps 104 retrieve information from database 100. Of course, the same sales rep could both send and retrieve information from database 100.

Sales rep 102 sends information related to a contact, be it an existing customer or a prospective contact, to database 100. This information can include the name of the contact, the location of the contact, the account executive of the contact, the telephone number of the contact, a history of the nature and extent of previous contacts, the date and time previous products or services were sold to the contact, the price of the good or service sold, and space for other remarks, among other types of information. Sales rep 102 can glean information regarding a contact in a variety of ways, including referrals from existing customers.

Once the information is stored in database 100, the information is available to other sales reps. For example, if sales rep 104 wanted to contact a person or business, sales rep 104 can use the information in database 100 to prepare for the telephone call or meeting. Sales rep 104 could retrieve all of the information stored in database 100 to better understand the needs of the contact and prepare a specific or customized presentation for the contact. Preferably, database 100 includes provisions that help to prevent that customers who have elected not be solicited, to be removed as possible candidates for a sales or marketing call. All of the information previously sent to database 100, along with all of the experiences and contacts previously made with the contact, could be analyzed and used.

In this way, the entire experiences of the firm are readily available to any of the sales reps and the firm can present a consistent and competent image to the contact. For example, if a system according to the present invention were not used, it would be possible for a first sales rep to contact a potential customer and offer a certain good or service. If the customer declined, and later a second sales rep from the same firm offered the same or substantially similar good or service, the firm would appear incompetent and disorganized to the potential customer. Furthermore, these types of repeat contacts could expose the firm to liability under the consumer protection laws of some states. Similarly, if a second sales rep were to offer a good or service that the customer had already purchased, the firm may create confusion, and again, the reliability and reputation of the firm would be questioned. These and other problems are avoided by using a system according to the present invention.

In addition to retaining firm knowledge and experience about customers and contacts and using that information to prepare sales reps, the database according to the invention can also be used to provide management with information regarding the sales reps. Policies can be established in a company that require sales reps to record all of their sales activities in database 100. Database 100 then can be used to generate reports 106 that track the sales activities of the sales reps.

These reports 106 can include information, such as, the number of contacts, the number of products or services sold, and the number of new contacts entered into database 100, among other items. With this information, database 100 can provide information comparing the performance of each sales rep with established performance metrics or goals.

The invention includes a method to characterize the quality of a customer contact. For example, a simple follow up telephone call with a customer who recently ordered a product to confirm that the product has been received by the customer would not count as a "quality contact." In contrast, a lengthy meeting in which a sales rep presented and discussed a good or service for a significant period of time and offered the good or service for sale would count as a "quality contact." So, the performance metrics could be designed to distinguish between a quality contact and a simple or routine contact.

The invention also provides two optional features. The first feature is an automated interaction with a billing system 108. For existing customers of the firm, billing information, which would provide information related to the purchasing habits and preferences of a customer, could be automatically sent to database 100. Database 100 would automatically associate the billing information with the other information previously collected about a particular customer. In this way, a sales rep would have the benefit of previous historical experiences with the customer along with the customer's spending patterns. This would provide additional beneficial information to the sales rep in preparing for a meeting or in preparing a presentation for an existing client.

Another optional feature of the present invention is a web site 110 that permits interested parties to interact with database 100. Sales reps and managers could send and retrieve information from database 100 by using web site 110. Web site 110 would allow anyone at any location with Internet access to interact with database 100. Preferably, web site 110 is a secure web site 110.

Database 100 preferably includes an interface 150 between the users and other portions of database 100, for example, the memory 160. Memory 160 can be volatile, for example, RAM, and/or non-volatile, for example, a mass storage device such as a disk or tape made of magnetic or optical media. Interface 150 facilitates user interaction with database 100. In the preferred embodiment, sales reps 102 and 104 interact with database 100 using a menu driven system to retrieve and store data.

Figure 2:
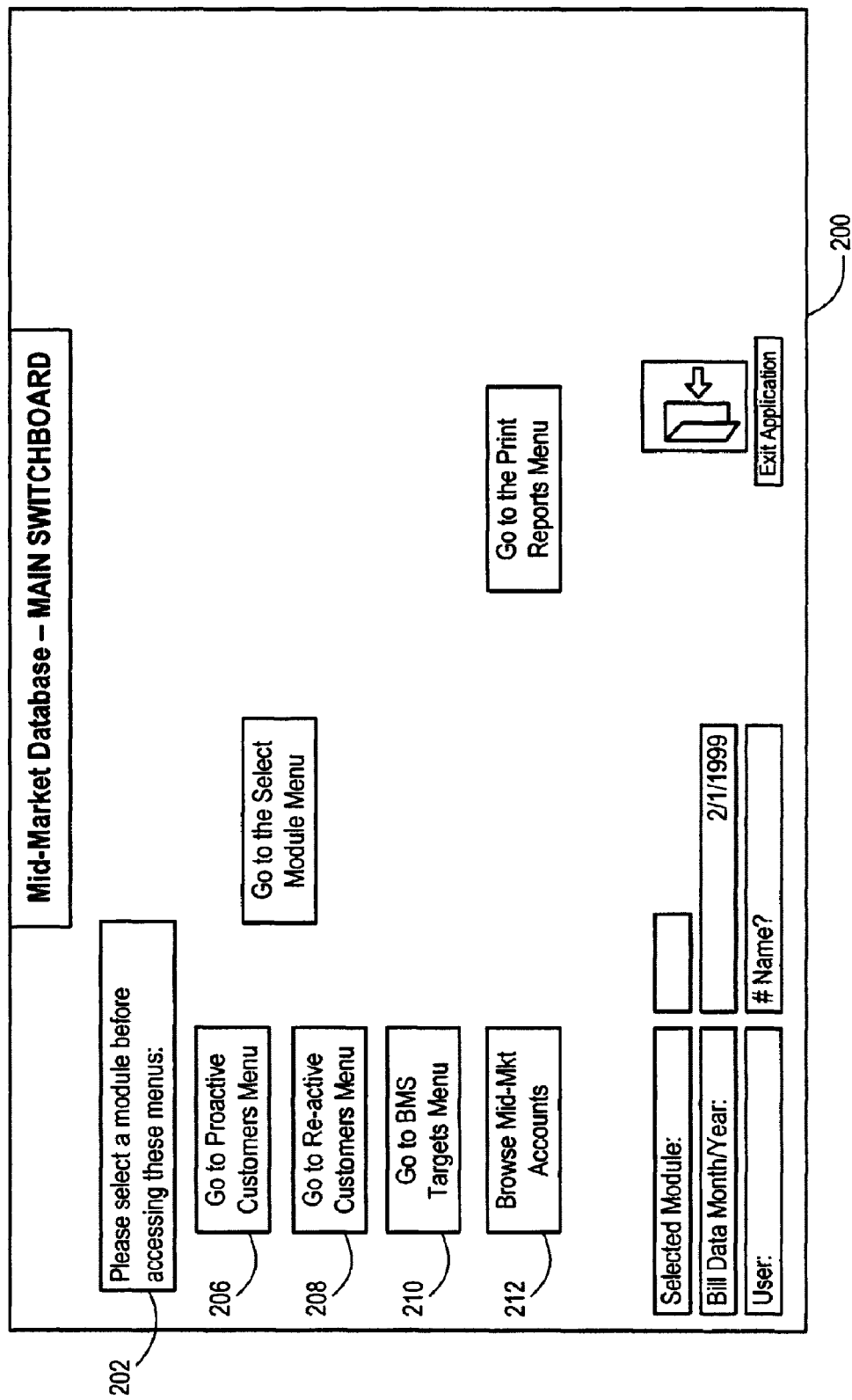
FIG. 2 is a preferred embodiment of an opening screen according to the invention.

FIG. 2 is a preferred embodiment of an opening screen 200 for interface 150. The embodiment shown in FIG. 2 demonstrates the principles of the present invention by using, as an example, mid-market telecommunications customers. Clearly, this invention can be applied to a variety of markets, types of customers, and marketing or sales efforts. But for clarity, this disclosure will focus on a single preferred embodiment of the invention, directed to mid-market telecommunications customers. It should be kept in mind that the invention is much broader, and suitable for a variety of different applications.

The preferred embodiment includes the use of modules, which are groups of customers. The modules can be arranged in any desired manner, for example, by size and/or geographic location. Modules help to reduce the size of data accessed by the user, and in that way, allows users to better target their searches. Modules are optional, and the invention can function effectively without modules.

The opening screen 200 (labeled "main switchboard") includes a notice 202 that requests the user to select a module. Users can select a module by pointing and clicking on the Go to the Select Module Menu button 204. After a module has been selected, the user returns to opening screen 200. From there, the user has a variety of options. The user can go to various menus that are related to different types of customers, the user can browse mid-market accounts, or the user can go to the print reports menu.

Preferably, different types of customers have their own menus and options. One example of categorizing different types of customers is by the initial customer contact. In the preferred embodiment, there are proactive customers, reactive customers, and target customers. Proactive customers are customers that are currently customers of the company, but are served by a different division than the mid-market division, and that, based on an analysis of the customer's interactions with the company, may be interested in the services offered by the mid-market division. Re-active customers are customers that took the initiative and contacted the company to request a particular service that is offered by the mid-market division. Finally, target customers are those that do not currently have any known relationship with the company, but based on statistical and business data, may be interested in the services offered by the mid-market division.

In the preferred embodiment, each of these types of customers has its own set of menus and options. Users can review proactive customers by pointing and clicking on the Go to Proactive Customers Menu Button 206. Similarly, users can interact with information regarding re-active customers by pointing and clicking on the Go To Re-Active Customers Menu button 208. Likewise, users can access information related to target customers by pointing and clicking the Go To BMS Targets Menu button 210. By selecting those buttons, users enter into another screen that deals specifically with that particular group of customers, as discussed below, in connection with FIGS. 3-7.

Users can also browse all of the existing accounts by selecting The Browse Mid-Mkt Accounts button 212. And users can print various reports by selecting The Go To Print Reports Menu button 214. Opening screen 200 also has an exit button 216 that allows users to end their session.

Figure 3:
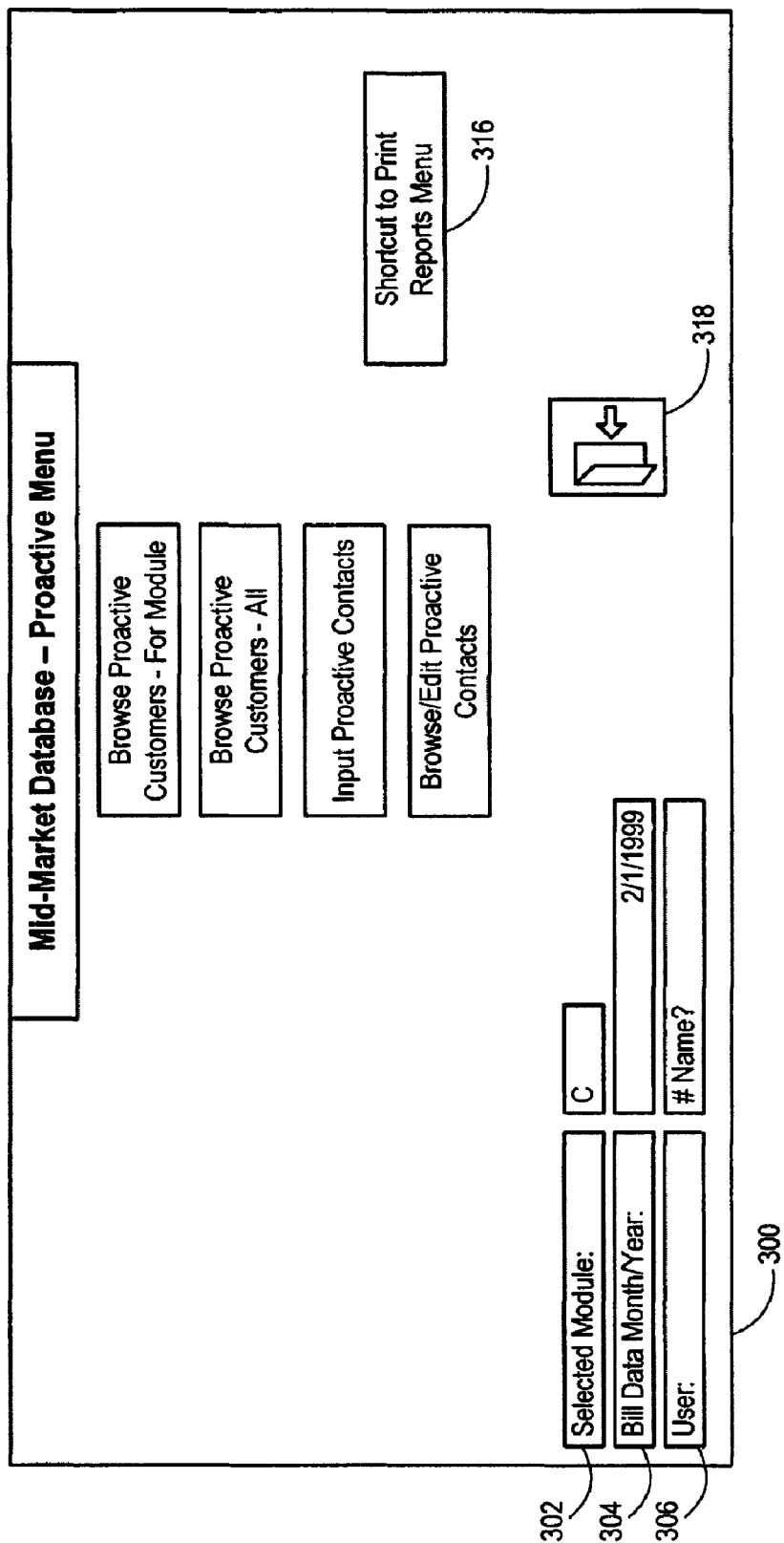
FIG. 3 is a preferred embodiment of a proactive menu according to the invention.

After clicking through the Proactive Customers button 206 in FIG. 2, the graphical user interface displays the Mid-Market Database—Proactive Menu screen 300, as shown in FIG. 3. The Proactive Menu screen 300 and its subsequent submenus are substantially similar, except for the title and the names of some of the fields, to the Reactive Menu screen and its subsequent submenus, which are accessed by clicking through the Reactive Customers button 208 in FIG. 2. For clarity, only the Proactive screens will be described herein, but it should be kept in mind that the Reactive Customers menus and screens are substantially similar to the Proactive menus and screens. The Proactive Menu screen 300 indicates the part of the database information with which the user is interacting. For example, the Proactive Menu screen 300 displays the selected module 302, the bill data month/year 304, and the user 306.

The Proactive Menu screen 300 also includes action buttons through which the user can access the Proactive database functions of the present invention. These action buttons preferably include Browse Proactive Customers—For Module 308, Browse Proactive Customers—All 310, Input Proactive Contacts 312, and Browse/Edit Proactive Contacts 314. Clicking through Browse Proactive Customers—For Module 308 enables a user to scroll in alphabetical order through the proactive customers listed in the selected module 302. Clicking through Browse Proactive Customers—All 310 serves the same function, but allows the user to scroll through customers of all modules. Input Proactive Functions 312 initiates a screen of blank fields into which the user can enter information on new proactive contacts. See FIG. 6. Finally, Browse/Edit Proactive Contacts 314 enables a user to scroll through proactive contacts and edit the contents. See FIG. 7.

The screens displayed after clicking through either Browse Proactive Customers—For Module 308 or Browse Proactive Customers—All 310 are identical except for the title. For brevity, only the screens for browsing a selected module are described and illustrated herein. Upon clicking through Browse Proactive Customers—For Module 308, the graphical user interface presents the Browse Proactive Customers Form 400, as shown in FIG. 4. This screen provides several data fields 402 concerning customer account information, customer contact information, and program user information. The Form 400 also provides action buttons for editing customer data 404, displaying reports of accounts for selected customers 406, and printing reports of accounts for selected customers 408.

In the preferred embodiment, Form 400 includes the following data fields: MAN FID (MAN FID is a customer identifier); local service (recurring monthly charges); number of accounts; name assigned to MAN (the name of the mid-market customer); AE assigned to customer (AE is the name or identification of the vendor's account executive who is responsible for contacting the customer); customer contact; contact number; and, remarks (which include details on the type, quality, and outcome of a contact).

Form 400 also preferably includes data fields concerning program user information and edit tracking, for example: an "edited by" field listing the user who made the last edit and a "last edit" field indicating when that last edit was made.

To assist a user in browsing the customers, Form 400 also provides a "select by name" field and a "select by MAN" field. In this manner, a user can enter the desired customer's name or identification, or the first few characters of that name or identification, to prompt the graphical user interface to jump to and display that portion of the database.

In addition the Proactive database function buttons, the Proactive menu screen 300 includes a Shortcut to Print Reports Menu button 316 and an exit button 318. Clicking through Shortcut to Print Reports Menu button 316 enables a user to jump directly to a Print Reports Menu where the user can print a variety of records. The Print Reports Menu that users are directed to after selecting button 316 is preferably the same menu as the one users are directed to after selecting button 214 (see FIG. 2). Clicking through exit button 318 closes the menu and returns the user to the opening screen 200. Thus, once a user has found and selected a desired customer, the user can display and print out a report of that customer's accounts using the display button 406 and the print button 408.

Figure 5:
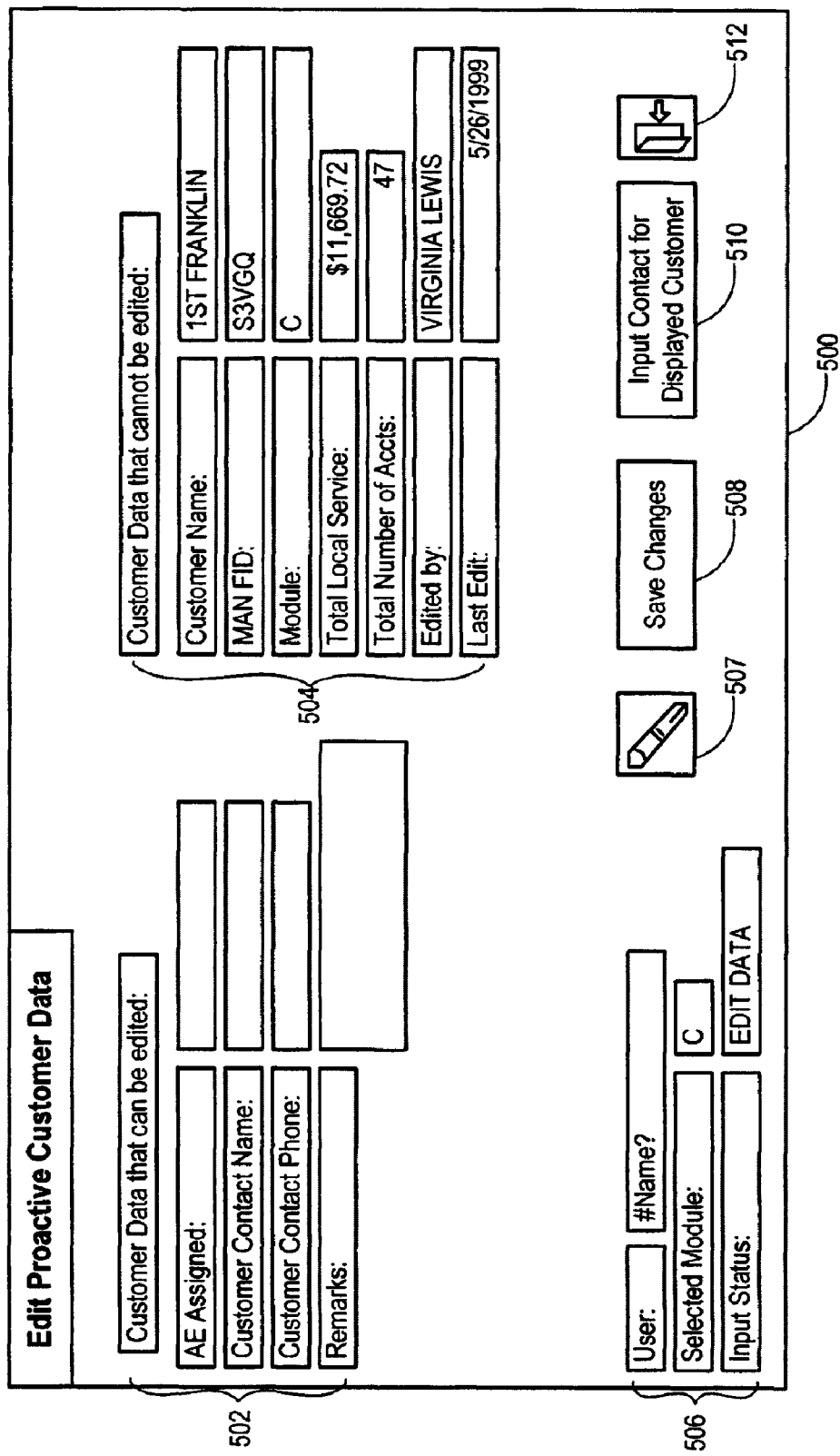
FIG. 5 is a preferred embodiment of an editing screen according to the invention.

After viewing a customer's account information, a user can edit the customer data by clicking through Edit Customer Data button 404. In response, the graphical user interface displays the Edit Proactive Customer Data screen 500, as shown in FIG. 5. Screen 500 presents three areas of information: customer data that can be edited 502, customer data that cannot be edited 504, and information regarding the user interaction with the database 506. In the preferred embodiment of the present invention, the customer data that can be edited 502 includes AE assigned, customer contact name, customer contact phone, and remarks. With these fields, the user can update the database with information concerning any changes in the AE assigned to the customer, any changes in the point of contact for the customer, and any special notes about the customer or customer's point of contact, for example, the typical times the point of contact can be reached. The customer data that cannot be edited 504 includes information required to register the customer in the database, such as the customer name, MAN FID, module, total local service, total number of accounts, edited by, and last edit. Finally, the information regarding the user interaction with the database 506 preferably includes the user, the selected module, and the input status.

In addition to providing data fields, Edit Proactive Customer Data Screen 500 preferably provides function buttons such as erase 507 (to clear all data fields that can be edited), Save Changes 508 (to update the customer data 502 with the newly entered information), Input Contact for Displayed Customer 510 (to jump to screen 600 shown in FIG. 6, in which the user can enter information regarding ongoing contacts, preferably, when the user is directed to screen 600, the database 100 automatically retrieves the information related to the customer currently displayed on screen 500, and populates the fields on screen 600 with that information), and exit 512 (to close the screen and return to the previous screen).

After a user has indicated a choice to enter a proactive contact, interface 150 preferably provides an Enter Proactive Contacts screen 600. The Proactive Contacts screen 600 provides a date of contact field 602 where users can type in the date of the contact, and a type of quality contact field 604. Field 604 is preferably limited to a preselected number of types of quality customer contacts. For example, the preferred embodiment includes a SV (service visit), an MV (maintenance visit), an OV (other visit), an SP (service phone call), an MP (maintenance), or an OP (other phone call). Screen 600 also provides a remarks field 606 that can accommodate free text. Screen 600 also includes a products region 608. In the products region, users can indicate which products or services were discussed, which products or services were sold, and the quantity of each sale. Screen 600 also has a customer data region 610. Like other screens of the preferred embodiment, users can enter the customer's name, customer identification number, sales information, total number of accounts, the module for the customer, and customer contact information.

Screen 600 also includes a follow-up date field 612 where the user can enter a date for contacting the customer again. A follow-up remarks field 614 is also provided. This field is open (not restricted by format) and can include narrative text to assist in the preparation of the next customer contact.

At the top of screen 600, two buttons 616 provide guidelines and additional information regarding quality contacts. This information is used by the user to determine if a contact should be regarded as a quality contact. The preferred guidelines include dialogue boxes or windows that state the following.

SALES (PREMISE) VISIT: Visit to promote, explain, negotiate initial or additional product or service, whether it results in sale of the product or service or not.

SALES PHONE: Phone call to promote, explain, negotiate initial or additional product or service, whether it results in sale or not.

MAINTENANCE (PREMISE) VISIT: explain first bill; perform complete explanation of any product or service; and/or make major changes to options.

MAINTENANCE PHONE CALL: a lengthy customer call that adds value or leads to substantial work, for example: explain first bill; explain any product or service; change current product or service options; research or investigate payment posting; new customer contact; resolve service issues.

NOT A QUALITY CONTACT: minor adjustments to existing service or minor changes to the billing account; explain charges on any payment or a bill; handle any minor question; change a billing address; handle a request for a reprint/recreate of last bill; schedule meeting with customer.

The two section fields 618 called Select by Assigned Name and Select by MAN FID permit users to navigate through the records stored in database 100 to quickly find the desired customer record.

Returning to FIG. 2, when a user wishes to browse all of the accounts or all of the accounts of a given module, the user selects button 212. When that occurs, the system provides a browse mid-market accounts screen 700. The browse screen 700 permits users to retrieve and review all of the existing accounts by navigating through the accounts database.

Like other screens provided by the preferred embodiment, screen 700 has a region 702 that includes customer information, including billing number cent fid (a code related to the market to which the customer belongs), site (a billing system indicator), name, address, MAN FID, local service sales, input date and a field indicating who input the data. Screen 700 includes a region 704 that indicates the type of customer and the services currently used by the customer. By implication, this region also indicates prior sales that have been made as well. Screen 700 has a navigation region 706 that allows users to jump to other records by selecting a letter of the alphabet. Users also have the capability to change the status of the displayed customer record to either a reactive customer or to a target customer by using buttons 708 and 710, respectively. Button 716 allows users to browse by man fid or customer code. In other words, the data will be sorted and displayed by man fid or customer code, as opposed to by customer name, as shown in FIG. 7.

Screen 700 also includes a series of indicators 712. The indicators 712 show how the customers have been classified. For example, the classifications could be Proactive, Reactive, Target, and Do Not Call. The Do Not Call indicator 714 is a special class of customers. These customers have elected not to receive solicitations by previously informing the company of their choice. Contacting such customers may be regulated by law, and could result in fines and other forms of punishment. Thus, customers who are classified as Do Not Call are not placed in the Proactive list, database 100 prevents such customers from being included in that list, and have an indicator 714 to inform users of their election.

In this way, users can easily interact, retrieve, and store information on database 100 and navigate through database 100 to desired records or collections of information.

While the system and method described herein and illustrated in the figures contains many specific examples of information flow steps, these steps should not be construed as limitations on the scope of the invention, but rather as examples of practical applications that could be used to practice the invention. As would be apparent to one of ordinary skill in the art, many other variations on the system operation are possible, including differently grouped and ordered method steps. Accordingly, the scope of the invention should be determined not by the embodiments illustrated by these examples, but by the appended claims and their equivalents.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for retaining and using contact information, comprising:
   receiving a first item of contact information regarding a contact from one of a plurality of sales representatives via a graphical user interface ("GUI") displayed on a computer executing a software application;
   storing the first item of contact information in at least one searchable database in communication with the computer and associating the first item of contact information with a particular entity;
   classifying the contact by a quality classification the quality classification being indicated by one of a set of specific guidelines required by the software application indicating the value of the contact to the sales representatives, the set of guidelines including at least one of the following classifications:
      a Sales Visit, wherein a Sales Visit comprises an on site visit to promote a sale whether a sale occurs or not;
      a Sales Phone Call, wherein a Sales Phone comprises a telephone call to promote a sale whether a sale occurs or not;
      a Maintenance Visit, wherein a Maintenance Visit comprises an on site visit to explain one of a first bill and a product or service;
      a Maintenance Phone Call, wherein a Maintenance Phone Call comprises an telephone call to explain one of a first bill and a product or service; and
      Not a Quality Contact, wherein Not a Quality Contact comprises one of a telephone call and a visit to resolve an administrative issue;
   receiving and storing information in the at least one searchable database, via the GUI, regarding the type of initial contact, wherein information regarding quality was also received about the particular entity;
   classifying the contact by an initial customer classification, the initial customer classification being indicated from a set of specific customer classes required by the software application including at least one of:
      a reactive contact class, where customers classified as reactive are those that have initiated contact with one of the plurality of sales representatives;
      a proactive contact class, where customers classified as proactive are those where a sales representative initiated the contact with the customer; and
      a target class, where customers classified as targets are those with no known relationship with the company but may be interested in services of the company;
   receiving proactive contact information, via the GUI, in a plurality of data fields in the at least one searchable database, the proactive contact information comprising customer account information, customer identification information, and quality contact type information, the quality contact type information comprising at least one of customer visit information and customer telephone call information;
   tracking edits to the proactive contact information in at least one of the plurality of data fields including indicating when a last edit to the proactive contact information was made;
   generating at least one report associated with the proactive contact which is utilized to track sales activities, compare the performance of the one of the plurality of sales representatives with at least one established performance metric, and determine which of a plurality of entities should be contacted and in what order;
   classifying the one or more customers as a do not call customer, and if so, preventing the one or more customers on the do not call list from receiving solicitations from the one of a plurality of sales representatives;
   importing, electronically from a billing system, billing information associated with the particular entity in the at least one searchable database for review by the one of the plurality of sales representatives, wherein the billing information is associated with previously collected historical information associated with the one or more contacts and the one of the plurality of sales representatives; and providing the report based on the associated quality, classification and billing information in the at least one searchable database via a printout in a format indicating which particular entities should be contacted and in what order.

2. The method according to claim 1, wherein the first item of contact information is received through a website.

3. The method according to claim 1, wherein the first item of contact information, the contact quality and the contact classification is received from different sales representatives.

4. The method according to claim 3, wherein the first item of information, the contact quality and the contact classification are provided to a sales representative that did not provide any of the first item of information, the contact quality and contact classification information.

5. The method according to claim 1, wherein the entity is a business.

6. The method according to claim 1, wherein the first item of contact information is associated with a sales representative.

7. The method according to claim 1, wherein the report is sorted chronologically.

8. The method according to claim 1, wherein sales representatives are automatically notified of appointed contacts.

9. The method of claim 1, further comprising storing information into the at least one database to reflect that a particular entity desires not to be contacted in the future.

* * * * *